(12) United States Patent
Kim et al.

(10) Patent No.: US 9,468,007 B2
(45) Date of Patent: Oct. 11, 2016

(54) METHOD AND DEVICE FOR TRANSMITTING AND RECEIVING AVAILABLE CHANNEL INFORMATION BASED ON DIRECTIVITY IN WIRELESS COMMUNICATION SYSTEM

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Eunsun Kim, Anyang-si (KR); Dae Sik Hong, Seoul (KR); Gosan Noh, Hwaseong-si (KR); Yongho Seok, Anyang-si (KR); Ji-Haeng Heo, Seoul (KR)

(73) Assignees: LG ELECTRONICS INC., Seoul (KR); INDUSTRY-ACADEMIC COOPERATION FOUNDATION, YONSEI UNIVERSITY, Seoul (KR)

(*) Notice: Subject to any disclaimer, the term of this patent is extended or adjusted under 35 U.S.C. 154(b) by 0 days.

(21) Appl. No.: 14/363,213

(22) PCT Filed: Dec. 5, 2012

(86) PCT No.: PCT/KR2012/010469
§ 371 (c)(1),
(2) Date: Jun. 5, 2014

(87) PCT Pub. No.: WO2013/085275
PCT Pub. Date: Jun. 13, 2013

(65) Prior Publication Data
US 2014/0334422 A1    Nov. 13, 2014

Related U.S. Application Data

(60) Provisional application No. 61/567,078, filed on Dec. 5, 2011.

(51) Int. Cl.
*H04W 4/00* (2009.01)
*H04W 24/00* (2009.01)
(Continued)

(52) U.S. Cl.
CPC ........... *H04W 72/048* (2013.01); *H04W 48/04* (2013.01); *H04W 64/006* (2013.01); *H04W 48/14* (2013.01); *H04W 48/16* (2013.01)

(58) Field of Classification Search
CPC ... H04W 40/20; H04W 40/38; H04W 48/04; H04W 48/14; H04W 48/16; H04L 29/08081; H04L 29/08225
See application file for complete search history.

(56) References Cited

U.S. PATENT DOCUMENTS

| | | | | |
|---|---|---|---|---|
| 5,899,954 A | * | 5/1999 | Sato | G01C 22/02 340/988 |
| 7,412,326 B2 | * | 8/2008 | Yoshioka | G01C 21/367 340/990 |

(Continued)

OTHER PUBLICATIONS

Nekovee, et al., "A Survey of Cognitive Radio Access to TV White Spaces," International Journal of Digital Multimedia Broadcasting, vol. 2010, Article 1D 236568, Apr. 2010, 11 pages.

(Continued)

*Primary Examiner* — Alpus H Hsu
(74) *Attorney, Agent, or Firm* — Lee Hong Degerman Kang & Waimey; Jonathan Kang; Jeffrey Lotspeich

(57) ABSTRACT

Disclosed are a method and device for transmitting and receiving available channel information based on directivity in a wireless communication system. A method for enabling a station (STA) to receive available channel information in a whitespace band according to one embodiment of the present invention comprises the steps of: determining a current position of the STA and a position at which the direction is changed on a moving path of the STA; determining K (K≥1) operating ranges based on the current position of the STA and the position at which the direction is changed; transmitting a channel availability query (CAQ) request frame for the K operating ranges to a database; and receiving available channel information on the K operating ranges through a CAQ response frame from the database.

14 Claims, 14 Drawing Sheets

(51) Int. Cl.
*H04W 72/04* (2009.01)
*G01S 5/14* (2006.01)
*H04W 48/04* (2009.01)
*H04W 64/00* (2009.01)
*H04W 48/16* (2009.01)
*H04W 48/14* (2009.01)

(56) References Cited

U.S. PATENT DOCUMENTS

| | | | | |
|---|---|---|---|---|
| 7,630,828 B2* | 12/2009 | Tajima | ............... | G01C 21/3617 340/995.1 |
| 7,787,886 B2* | 8/2010 | Markhovsky | ......... | G01S 5/0294 455/456.1 |
| 7,822,424 B2* | 10/2010 | Markhovsky | ........... | G01S 13/74 455/456.1 |
| 7,995,801 B2* | 8/2011 | Kourogi | ............... | G01C 21/165 382/106 |
| 8,184,656 B2* | 5/2012 | Chandra | ....................... | 370/282 |
| 8,315,647 B2* | 11/2012 | Soma | ......................... | 455/422.1 |
| 8,467,359 B2* | 6/2013 | McCann | ................ | H04L 63/08 370/338 |
| 8,750,894 B1* | 6/2014 | Stogaitis | ................. | H04W 4/02 370/325 |
| 8,791,835 B2* | 7/2014 | Zhang | ................... | G01S 5/0072 340/426.31 |
| 8,965,684 B2* | 2/2015 | Takahashi | .............. | G01C 21/30 701/411 |
| 2003/0198346 A1* | 10/2003 | Meifu | .................... | G06Q 30/02 380/258 |
| 2011/0010082 A1* | 1/2011 | Wilson | ................... | G01C 23/00 701/532 |
| 2011/0280180 A1 | 11/2011 | McCann et al. | | |
| 2012/0275373 A1* | 11/2012 | Takahashi | ............... | H04W 4/04 370/315 |

OTHER PUBLICATIONS

Ghosh, et al., "Coexistence Challenges for Heterogeneous Cognitive Wireless Networks in TV White Spaces," IEEE, Aug. 2011, 13 pages (relevant pages: pp. 1-2, 5).
PCT International Application No. PCT/KR2012/010469, Written Opinion of the International Searching Authority dated Mar. 4, 2013, 16 pages.

* cited by examiner

FIG. 6
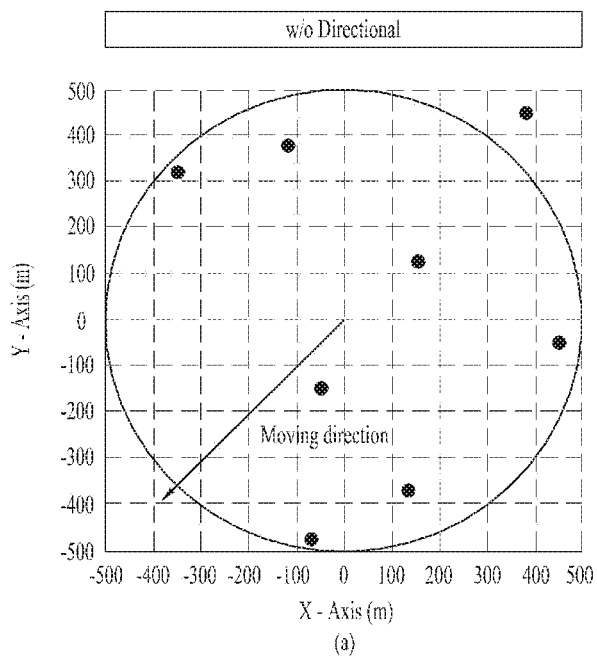
(a)
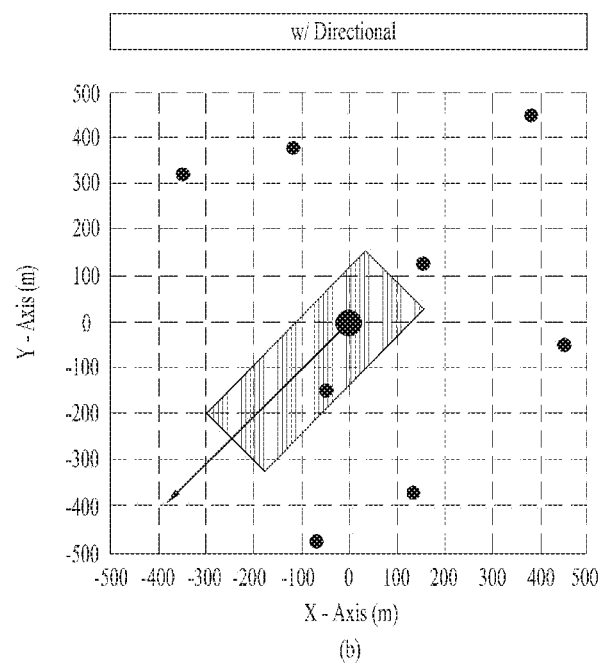
(b)

1st CAQ      2nd CAQ      3rd CAQ

Primary setting      Secondary setting      Final setting

METHOD AND DEVICE FOR TRANSMITTING AND RECEIVING AVAILABLE CHANNEL INFORMATION BASED ON DIRECTIVITY IN WIRELESS COMMUNICATION SYSTEM

CROSS-REFERENCE TO RELATED APPLICATIONS

This application is the National Stage filing under 35 U.S.C. 371 of International Application No. PCT/KR2012/010469, filed on Dec. 5, 2012, which claims the benefit of U.S. Provisional Application Ser. No. 61/567,078, filed on Dec. 5, 2011, the contents of which are hereby incorporated by reference herein in their entirety.

TECHNICAL FIELD

The present invention relates to a method and apparatus for transceiving available channel information based on directionality in a wireless communication system.

BACKGROUND ART

The standards for wireless local area network (WLAN) technologies are established by the Institute of Electrical and Electronics Engineers (IEEE) 802.11 standards committee. IEEE 802.11a and IEEE 802.11b respectively provide data rates of 54 Mbps and 11 Mbps using unlicensed bands of 2.4 GHz and 5 GHz. IEEE 802.11g adopts Orthogonal Frequency Divisional Multiplexing (OFDM) at 2.4 GHz and provides a data rate of 54 Mbps. IEEE 802.11n adopts Multiple Input Multiple Output (MIMO)-OFDM and provides a data rate of 300 Mbps for four spatial streams. IEEE 802.11n supports a channel bandwidth up to 40 MHz and provides a data rate of 600 Mbps.

A communication scheme for allowing operations of unlicensed users in frequency bands basically defined for use of licensed users is under discussion. Here, frequency bands temporarily not used by licensed users may be called white space and, particularly, white space in TV bands may be called TV white space (TVWS).

The IEEE 802/11af standard for defining operations of unlicensed devices in TVWS bands is currently under development.

TVWS includes very high frequency (VHF) bands (54 to 60, 76 to 88, and 174 to 216 MHz) and an ultra high frequency (UHF) band (470 to 698 MHz) allocated for TV broadcast, and refers to frequency bands allowed for use of unlicensed devices on condition that they do not disturb communication of licensed devices (TV broadcast, wireless microphones, etc.) operating in the frequency bands.

512 to 608 MHz and 614 to 698 MHz bands are allowed for operation of all unlicensed devices except for some special cases, but 54 to 60 MHz, 76 to 88 MHz, 174 to 216 MHz, and 470 to 512 MHz bands are allowed for communication between fixed devices only. The fixed device refers to a device which transmits data at a fixed location only. In the following description, white space bands include the above-described TVWS, but are not limited thereto.

An unlicensed device which desires to use a white space band should provide a function of protecting licensed devices. Accordingly, the unlicensed device should check whether a white space band is occupied by a licensed device, before starting transmission in the white space band. That is, the unlicensed device may be allowed to use the white space band only when a licensed device is not using the white space band.

In this regard, the unlicensed device should access a geo-location database (GDB) via the Internet or a dedicated network to acquire information about a list of channels (i.e., a set of channels) available in a corresponding area. The GDB is a database for storing and managing device information of licensed devices registered therein and channel usage information dynamically changed depending on geographical locations and channel using times of the licensed devices. To solve a problem of coexistence of unlicensed devices using the white space, a signaling protocol, e.g., common beacon frame, and a spectrum sensing mechanism may be used.

In the IEEE 802.11 system, a TVWS device may refer to an unlicensed device operating in a TVWS spectrum using a medium access control (MAC) layer and a physical (PHY) layer of IEEE 802.11. In this specification, unless otherwise mentioned, a station (STA) refers to a TVWS device operating in a TVWS spectrum.

An STA should provide a function of protecting incumbent or primary users having access priority and including licensed users (e.g., TV user, wireless microphone, etc.). That is, when an incumbent user is using TVWS, the STA should stop using a corresponding channel. Accordingly, the STA should find out a channel available to unlicensed devices (i.e., a channel not used by a licensed device) and operate on the available channel.

The STA may find out an available channel by performing a spectrum sensing mechanism or by accessing a GDB to find out a TV channel schedule. The spectrum sensing mechanism may include energy detection (a scheme for determining that an incumbent user is using a channel if the intensity of a received signal is equal to or higher than a certain value), feature detection (a scheme for determining that an incumbent user is using a channel if a digital TV preamble is detected), etc. Then, the STA should access the GDB to acquire GDB information based on location information thereof to check whether a licensed device is using a channel at the location. Access to and information acquisition from the GDB should be performed a sufficient number of times to protect the licensed device.

Upon determining that an incumbent user is using a channel immediately next to a currently used channel through the spectrum sensing mechanism or GDB, a terminal (or STA) and a base station (or access point (AP)) may protect the incumbent user by reducing transmit power.

For details of operation in TVWS, reference can be made to, for example, "Second Memorandum Opinion and Order" (FCC, ET Docket No. 10-174, September 2010.), "IEEE 802.22: The first cognitive radio wireless regional area network standard," (C. R. Stevenson, G. Chouinard, Z. Lei, W. Hu, S. J. Shellhammer, and W. Caldwell, IEEE Commun Mag., pp. 130-138, January 2009.), "TVWS PAR and 5C," (IEEE 802.11-09/0934r05, September 2009.), and "Enhancing Channel Availability Query to support database query for multiple locations based on multiple locations, IEEE 802.11af-11/462r4" (Y-D. Alemeseged, Y. Seok, P. Kafle, S. Shelhammer and H. Harada, April 2011).

DISCLOSURE

Technical Problem

When an STA moves, available channel information at a new location needs to be requested and acquired. If available channel information is transceived whenever the location of the STA is changed, a time delay may occur. Accordingly, in a conventional wireless communication system, a scheme for reducing a time delay in request and response of available channel information by providing the available channel information for a wider operating range is defined.

However, if an operating range which is the basis for determining available channels is set wide, the available channels are determined in consideration of even locations not actually included in a moving route of an STA. That is, as an operating range is set wider, the number of channels commonly available in the operating range may be generally reduced and thus system performance may be degraded. Further, some channels which are actually available on a moving route of an STA may not be included in an available channel list determined based on a wide operating range, and thus channel resources may be used inefficiently.

An object of the present invention devised to solve the problem lies in a method for setting operating ranges in a white space band in consideration of directionality of an STA and determining available channels according to the set operating ranges. Another object of the present invention devised to solve the problem lies in a method for efficiently requesting and responding a channel availability query for available channel information in a white space band in consideration of directionality of an STA.

It is to be understood that both the foregoing general description and the following detailed description of the present invention are exemplary and explanatory and are intended to provide further explanation of the invention as claimed.

Technical Solution

The object of the present invention can be achieved by providing a method for receiving available channel information in a white space band by a station (STA), the method including determining a current location of the STA and locations from which directionality is changed, on a moving route of the STA, determining K (K≥1) operating ranges based on the current location of the STA and the locations from which the directionality is changed, transmitting a channel availability query (CAQ) request frame for the K operating ranges to a database, and receiving available channel information for the K operating ranges from the database through a CAQ response frame.

In another aspect of the present invention, provided herein is a station (STA) device for receiving available channel information in a white space band, the STA device including a communication unit for communicating with an external device, and a controller for controlling the STA device including the communication unit, wherein the controller is configured to determine a current location of the STA and locations from which directionality is changed, on a moving route of the STA, determine K (K≥1) operating ranges based on the current location of the STA and the locations from which the directionality is changed, transmitting a channel availability query (CAQ) request frame for the K operating ranges to a database using the communication unit, and receiving available channel information for the K operating ranges from the database through a CAQ response frame using the communication unit.

The followings may be commonly applied to the above method and the STA device.

The CAQ request frame may include information about the K operating ranges included within a fixed moving distance.

The CAQ request frame may include information about the K operating ranges.

K may be 7.

Information about the K operating ranges may include K+1 pieces of location information and K pieces of width information.

The K+1 pieces of location information may include information about the current location of the STA, the locations from which the directionality is changed, and a destination location of the moving route.

One operating range may be determined based on information about two locations and information about a width.

The one operating range may have an area determined as a product of a distance between the two locations, and the width.

A first location of the two locations may be determined as a location spaced apart from a reference location by a predetermined distance in a direction opposite to a moving direction of the STA.

A second location of the two locations may be determined as a location which is present in a direction equal to the moving direction of the STA from the reference location and from which the directionality is changed, or a destination location of the moving route.

The reference location of a first operating range may be the current location of the STA.

The reference location of an $(n+1)^{th}$ operating range may be the second location of an $n^{th}$ (n≥1) operating range.

The moving route may be a predicted moving route set based on an origin point and a destination of the STA.

It is to be understood that both the foregoing general description and the following detailed description of the present invention are exemplary and explanatory and are intended to provide further explanation of the invention as claimed.

Advantageous Effects

According to the present invention, a method and apparatus for setting operating ranges in a white space band in consideration of directionality of an STA and determining available channels according to the set operating ranges may be provided. Further, a method and apparatus for efficiently requesting and responding a channel availability query for available channel information in a white space band in consideration of directionality of an STA may be provided.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 6 is a view for describing an example of setting an operating range according to the present invention;

BEST MODE

Figure 1:
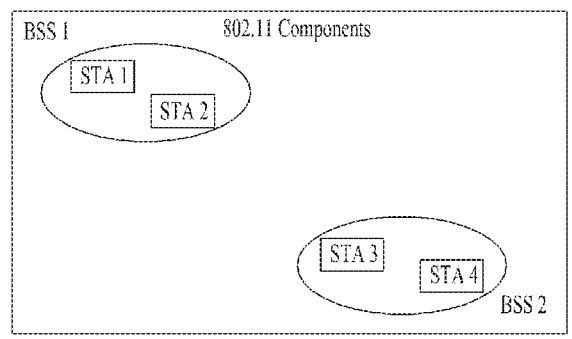
FIG. 1 is a view illustrating an exemplary architecture of the IEEE 802.11 system to which the present invention is applicable.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Embodiments described herein are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the embodiments of the present invention are provided to aid in understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, this application focuses on the IEEE 802.11 system. However, the technical features of the present invention are not limited thereto.

FIG. 1 is a view illustrating an exemplary architecture of the IEEE 802.11 system to which the present invention is applicable.

The IEEE 802.11 architecture may be composed of a plurality of components and provide a WLAN supporting station (STA) mobility transparent to higher layers according to interaction of the components. A basic service set (BSS) may correspond to a basic component block in IEEE 802.11 LAN. FIG. 1 exemplarily shows two BSSs (BSS1 and BSS2) each including two STAs as members (STA1 and STA2 are included in BSS1, and STA3 and STA4 are included in BSS2). In FIG. 1, an oval that defines a BSS may indicate a coverage area in which STAs belonging to the BSS perform communication. This area may be called a basic service area (BSA). When an STA moves out of the BSA, the STA may not directly communicate with other STAs in the BSA.

The most basic type of BSS in IEEE 802.11 LAN is an independent BSS (IBSS). For example, the IBSS may have a minimum configuration including only two STAs. The BSS (BSS1 or BSS2) shown in FIG. 1, which has the simplest form and in which components other than STAs are omitted, is a representative example of the IBSS. This configuration is possible when STAs can directly communicate with each other. This type of LAN may be configured as necessary rather than being previously designed, and may be called an ad-hoc network.

When an STA is switched on or off, or enters or exits the coverage of a BSS, membership of the STA in the BSS may be dynamically changed. To become a member of the BSS, the STA may join the BSS using a synchronization procedure. To access all services based on the BSS, the STA should be associated with the BSS. Association may be dynamically set and may use a distribution system service (DSS).

Figure 2:
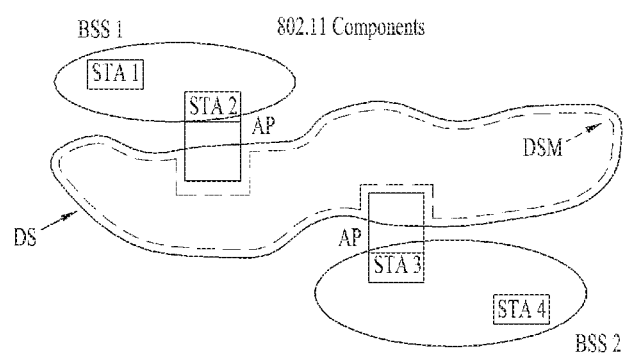
FIG. 2 is a view illustrating another exemplary architecture of the IEEE 802.11 system to which the present invention is applicable.

FIG. 2 is a view illustrating another exemplary architecture of the IEEE 802.11 system to which the present invention is applicable. FIG. 2 shows a distribution system (DS), a distribution system medium (DSM), and an access point (AP) in addition to the architecture of FIG. 1.

In a LAN, a direct station-to-station distance may be restricted by PHY performance. This distance restriction may be sufficient in some cases, but communication between stations having a long distance therebetween may be necessary in other cases. The DS may be configured to support an extended coverage.

The DS refers to an architecture in which BSSs are connected to each other. Specifically, BSSs may be present as components of an extended form of a network composed of a plurality of BSSs rather than being independently present as shown in FIG. 1.

The DS is a logical concept and may be specified by characteristics of the DSM. In this regard, the IEEE 802.11 standard logically discriminates a wireless medium (WM) from the DSM. These logical media are used for different purposes by different components. The IEEE 802.11 standard does not restrict these media as the same medium or different media. The flexibility of the IEEE 802.11 LAN architecture (DS architecture or another network architecture) is explained in that a plurality of media are logically different from each other. That is, the IEEE 802.11 LAN architecture may be implemented in various manners and each LAN architecture may be specified by physical characteristics of implementation.

The DS may support mobile devices by providing seamless integration of a plurality of BSSs and providing logical services required to manage addresses to destinations.

The AP refers to an entity which allows associated STAs to access the DS via a WM and has STA functionality. Data may be exchanged between a BSS and the DS via the AP. For example, STA2 and STA3 illustrated in FIG. 2 have STA functionality and provide a function of allowing associated STAs (STA1 and STA4) to access the DS. Further, all APs are addressable entities because they basically correspond to STAs. An address used by an AP for communication on the WM is not necessarily the same as an address used by the AP for communication on the DSM.

Data transmitted from one of STAs associated with an AP to an STA address of the AP may always be received by an uncontrolled port and processed by an IEEE 802.1X port access entity. Further, the transmitted data (or frame) may be delivered to the DS if a controlled port is authenticated.

Figure 3:
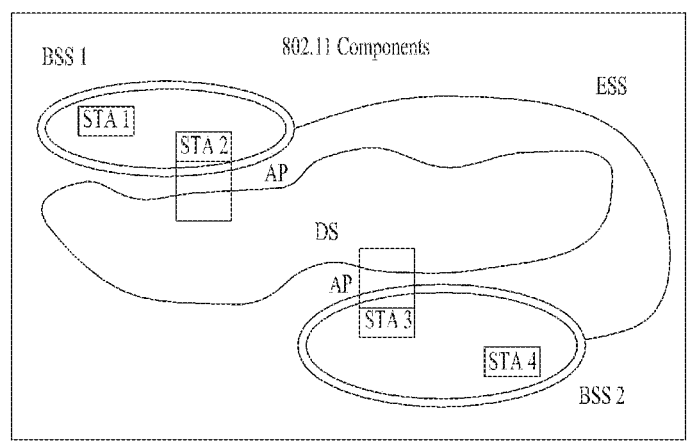
FIG. 3 is a view illustrating another exemplary architecture of the IEEE 802.11 system to which the present invention is applicable.

FIG. 3 is a view illustrating another exemplary architecture of the IEEE 802.11 system to which the present invention is applicable. FIG. 3 conceptually shows an extended service set (ESS) for providing an additional coverage to the architecture of FIG. 2.

A wireless network having an arbitrary size and complexity may be composed of a DS and an ESS. This type of network is called an ESS network in the IEEE 802.11 system. The ESS may correspond to a set of BSSs connected to a DS. However, the ESS does not include the DS. The ESS network looks like an IBSS network on a logical link control (LLC) layer. STAs included in the ESS may communicate with each other and mobile STAs may move from a BSS to another BSS (in the same ESS) transparently to the LCC layer.

IEEE 802.11 defines nothing about relative physical locations of BSSs in FIG. 3 and any of the followings is possible. The BSSs may partially overlap, which is a form generally used to provide continuous coverage. The BSSs may not be physically connected to each other and the logical distance between the BSSs has no restriction. In addition, the BSSs may be physically located at the same location to provide redundancy. Further, one (or more) IBSS(s) or ESS network(s) may be physically located in the same space as one (or more) ESS network(s). This may correspond to a form of an ESS network when an ad-hoc network operates in the location of the ESS network, when physically overlapping IEEE 802.11 networks are configured by different organizations, or when two or more different accesses and security policies are required at the same location.

Figure 4:
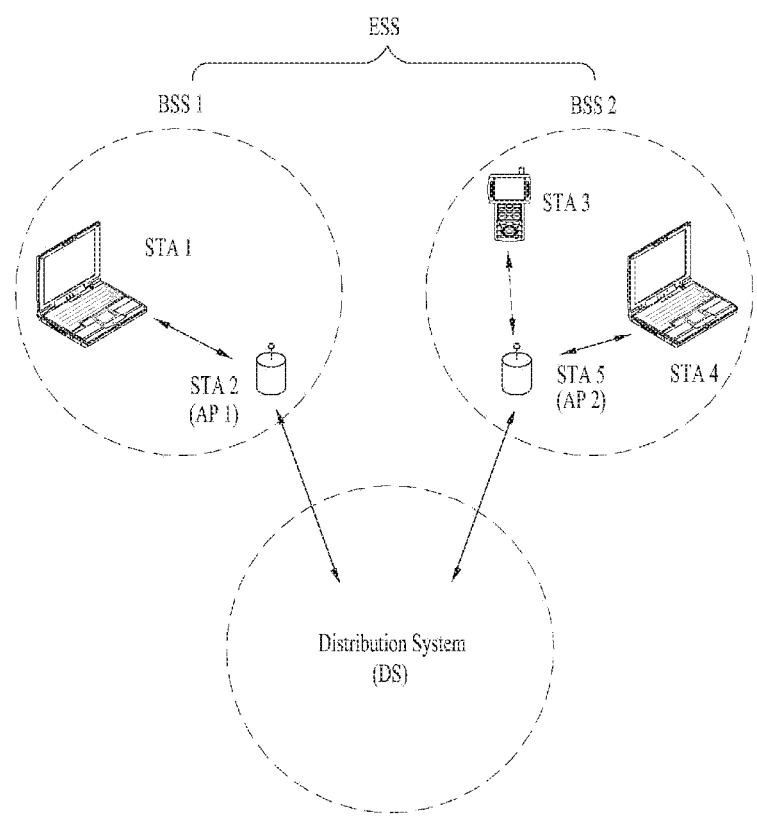
FIG. 4 is a view illustrating an exemplary architecture of a WLAN system.

FIG. 4 is a view illustrating an exemplary architecture of a WLAN system. FIG. 4 illustrates an example of BSSs based on an architecture including a DS.

In FIG. 4, BSS1 and BSS2 form an ESS. In the WLAN system, STAs are devices operating according to MAC/PHY regulations of IEEE 802.11. The STAs include an AP STA and a non-AP STA. The non-AP STA corresponds to a device generally managed directly by a user, e.g., laptop computer, mobile phone, etc. In FIG. 4, STA1, STA3 and STA4 correspond to the non-AP STAs, and STA2 and STA5 correspond to the AP STAs.

In the following description, the non-AP STA may be called a terminal, wireless transmit/receive unit (WTRU), user equipment (UE), mobile station (MS), mobile terminal, mobile subscriber station (MSS), etc. The AP corresponds to a base station (BS), Node-B, evolved Node-B (eNB), base transceiver system (BTS), femto BS, etc. in other wireless communication fields.

Available Channel in White Space

For operation of an STA in white space, protection of licensed devices (or incumbent users) should be preferentially provided. Accordingly, the STA should find out a channel not used by a licensed device and thus available to unlicensed devices, and operate on the available channel. If a channel being used by the STA is no longer available, the STA should stop using the channel.

To check channel (e.g. TV channel) availability in white space (e.g. TVWS), the STA may perform spectrum sensing or access a GDB to find out a TV channel schedule. GDB information may include channel usage information, for example, a schedule (e.g., time) for using a specific channel by a licensed device at a specific location. The STA which desires to check availability of a TV channel should access the GDB via the Internet, etc. to acquire GDB information based on location information thereof. This operation should be performed at an interval sufficient to protect licensed devices.

In this specification, information about available channels and frequencies, which is received from the GDB, is called a white space map (WSM). The WSM is a map of information about channels available to unlicensed devices in TVWS bands based on the channel and frequency information acquired by an STA from the GDB. The WSM may include information about a list of channels or frequencies available to unlicensed devices. Channels included in the available channel list are channels which are not used by signals (or users) that should be legally protected, and are available to an unlicensed device at a point of time when the unlicensed device accesses the GDB. Otherwise, if the unlicensed device requests information about channels available after a certain lapse of time from a point of time when the unlicensed device accesses the GDB, the WSM may include information about channels and frequencies which are available from the requested time. Alternatively, if the unlicensed device requests the GDB for available channel information, it is possible to transmit information about available channels and frequencies by signaling channels not available to the unlicensed device.

Federal Communications Commission (FCC) TVWS regulations currently define two device types. That is, a personal/portable device with low power, which is carried by a person, and a fixed device with high power, which operates at a fixed location, are defined. The fixed device may be referred to as a fixed STA and the personal/portable device may be referred to as a P/P STA. The fixed STA and P/P STA may correspond to normal STAs (i.e., STAs including an AP and a non-AP) in the WLAN system. When the devices of two types operate in the TVWS, different operation rules may be applied thereto. The fixed device transmits/receives a signal at a specific location which is not changed. The fixed device should access the GDB to acquire available channel information to transmit a signal at the specific location. While the fixed device may include a positioning device such as a GPS, an installer may directly input the location of the fixed device to transmit the location information of the fixed device to the GDB. When the installer directly inputs the location of the fixed device, it is assumed that once the fixed device is installed and the location thereof is input, the location does not change. When the location of the fixed device is changed, the changed location should be registered. The fixed device may serve another fixed device of the same type and the P/P device. When the fixed device receives available channel information from the GDB, the fixed device should transmit information about the device type thereof and receive information about available channels which can be directly used thereby. To serve the P/P device, the fixed device should additionally acquire information about available channels which can be used by the P/P device from the GDB or a proxy server connected to the GDB. This is because the fixed device and the P/P device use different channel periods and operate with different maximum allowable transmit powers and different requirements for neighboring channels and thus the respective device types require different available channel lists. For example, the fixed device is allowed to transmit a signal at 512 to 608 MHz and 614 to 698 MHz as well as at 54 to 60 MHz, 76 to 88 MHz, 174 to 216 MHz and 470 to 512 MHz, whereas the P/P device is not allowed to transmit a signal in TVWS bands other than 512 to 608 MHz and 614 to 698 MHz. The fixed device may transmit a signal with higher power than the P/P device and up to 4 watts is allowed for the fixed device as effective isotropic radiated power (EIRP).

The P/P device may transmit/receive signals at a non-specified location and the location thereof may be changed. The P/P device may be carried by a person and mobility thereof may not be predicted. Frequency bands available to the P/P device are 512 to 608 MHz and 614 to 698 MHz and maximum transmit power thereof is 100 mW (EIRP). That is, the allowable transmit power of the P/P device is limited compared to the fixed device.

The P/P device may be categorized into a mode II device and a mode I device according to whether the P/P device has identification capability, that is, geo-location capability and GDB accessibility or GDB access capability through the Internet. The mode II device has geo-location capability and GDB accessibility and may access the GDB to acquire information about channels available at a location thereof and then operate in TVWS at the location. In addition, the mode II device may acquire the available channel information from the GDB and then start communication through a network by transmitting a signal (e.g. enable signal) for instructing to start communication to the mode I device. The mode I device does not need to have geo-location capability or GDB accessibility and operates under the control of the mode II device or a fixed device. The mode I device may acquire available channel information from the mode II device or the fixed device and should periodically check the validity of available channels. In addition, the mode I device may be allowed to operate on an available channel upon confirmation of the device ID thereof. Here, the mode II device or the fixed device may correspond to an enabling STA and the mode I device may correspond to a dependent STA. An enabling signal transmitted from the enabling STA to the dependent STA may correspond to a beacon frame.

A P/P device corresponding to the mode II device may serve another P/P device or a fixed device. In this case, the mode II P/P device may acquire available channel information for the fixed device from the GDB and deliver the available channel information to the fixed device.

While exemplary embodiments of the present invention will be described hereinafter using TVWS as an example of white space for convenience, the scope of the present invention is not limited thereto. That is, the scope of the present invention includes exemplary embodiments of the present invention, which are applied to all operations in white space controlled by a DB which provides information about available channels at a specific location. For example, it is predicted to allow operation of an unlicensed device, controlled by a GDB, in frequency bands not currently corresponding to white space but predicted to become white space later, and exemplary embodiments of the present invention applied thereto may be included within the scope of the present invention. Further, while the principle of the present invention is described on the basis of final FCC regulations for TVWS, the scope of the present invention is not limited to operations in white space bands according to the FCC regulations and includes exemplary embodiments of the present invention implemented on white space bands conforming to other regulations.

Mode II Channel Availability Query (CAQ)

Mode II STA should be able to access GDB to register its location information therein and acquire a list of available TVWS channels therefrom. This procedure for acquiring an available channel list by Mode II STA is called Mode II channel availability query (CAQ) procedure.

After the Mode II STA acquires available channel information at a specific location using a CAQ procedure, if the location of the Mode II STA is changed by a predetermined distance or more or if previously acquired GDB information is no longer valid, the Mode II STA performs the CAQ procedure again. Basically, Mode II CAQ may be a procedure for acquiring available channel information for one specific location. Accordingly, if the Mode II STA moves by a predetermined distance or more (e.g., by 100 m or more) and thus its location information is changed, overhead may be caused to access the GDB again to acquire available channel information at a new location. To reduce this overhead, the Mode II STA may previously acquire available channel information for multiple locations from the GDB.

For example, the following procedure may be performed to allow the Mode II STA to use available channel information for multiple locations. 1) The Mode II STA checks its current location, 2) selects the current location and multiple peripheral locations, 3) transmits the selected location information to the GDB, 4) acquires a available channel list corresponding to each location from the GDB, 5) set an overlapping area of available channels as an operating range based on the acquired available channel list, 6) checks the current location every predetermined cycle (e.g., every 60 sec.), 7) regards the acquired available channel list (acquired in step 4) is valid for a predetermined time (e.g., 24 hours) and constantly uses a channel belonging to the acquired available channel list without accessing the GDB if the checked location is within the set operating range, and 8) accesses the GDB to update the available channel list if the checked location is out of the set operating range.

As another example, the following procedure may be performed to allow the Mode II STA to use available channel information for multiple locations. 1) The Mode II STA transmits information about an operating range about which available channel information is to be requested (for example, information for specifying one location (e.g., latitude, longitude, and altitude information) and vicinity information (e.g., a radius based on the single location)) to the GDB, 2) acquires a common available channel list within the operating range calculated by the GDB, from the GDB, 3) checks its current location every predetermined cycle (e.g., every 60 sec.), 4) regards the acquired available channel list (acquired in step 2) is valid for a predetermined time (e.g., 24 hours) and constantly uses a channel belonging to the acquired available channel list without accessing the GDB if the checked location is within the operating range, and 5) accesses the GDB to update the available channel list if the checked location is out of the set operating range.

In the above examples, the STA may not check the available channel information again from the GDB within the predetermined time (e.g., 24 hours) as long as the STA does not move out of the operating range. This is because a channel schedule of white space bands is previously determined for the predetermined time. However, if the STA moves out of the operating range, the acquired available channel information may not be used and thus the current location should be periodically checked every 60 sec. Accordingly, if available channel information for a specific operating range is used, the frequency of requesting a GDB for the available channel information by an STA having mobility may be reduced and thus resources to be used for data transception by the STA may be increased.

System performance depending on the frequency of requesting the available channel information may be given as Equation 1.

$$T_L = \frac{T(R) - d_p}{T(R)} \quad \text{[Equation 1]}$$

In Equation 1, $T_L$ denotes system performance. $T(R)$ denotes a frame length from when an STA requests available channel information once until when the STA requests the available channel information again. $d_p$ denotes a time taken to update the available channel information by the STA.

The time of $T(R)$ excluding $d_p$ may be regarded as a time used for data transmission by the STA. Since $d_p$ is fixed depending on the performance of the STA, system performance may be improved as $T(R)$ is increased.

Here, an average speed of the STA is given as $\tilde{v}$ and a radius of an operating range is given as $R$. If the STA moves within the operating range at a speed of $\tilde{v}$, the STA may be out of the operating range every $R/\tilde{v}$ hours in average. If the STA is out of the operating range, the STA should request the available channel information and thus $T(R)=R/\tilde{v}$. In other words, the frequency of requesting the available channel information by the STA is $\tilde{v}/R$.

If $T(R)=R/\tilde{v}$ is substituted in Equation 1 and then summarized, Equation 2 may be achieved.

$$T_L = \left(1 - d_p \frac{\tilde{v}}{R}\right) \quad \text{[Equation 2]}$$

In Equation 2, if system performance when no loss is present (i.e., when no time is taken to request the available channel information) is 1, a loss of the system performance corresponding to $d_p(\tilde{v}/R)$ may occur. As noted by Equation 2, if the operating range R is set large, the frequency $\tilde{v}/R$ of moving out of the operating range may be reduced and thus the loss of the system performance may also be reduced. On the other hand, if the operating range R is set small, the frequency $\tilde{v}/R$ of moving out of the operating range may be increased and thus the loss of the system performance may also be increased.

In brief, when an STA has mobility, if an operating range is set large (or wide), the possibility that the STA moves out of the operating range may be reduced, a time delay used to request and acquire available channel information to and from a GDB may be reduced, and signaling overhead is also reduced.

However, setting a large operating range is not always advantageous. For example, if the operating range is set large, the number of incumbent users (or licensed devices) to be considered in the operating range may be increased and thus the number of channels available to unlicensed devices may be reduced.

For example, if licensed devices are located with two-dimensional Poisson point process distribution at a density of $\lambda$, activity of each licensed device is $L_{on}$, and the area of an operating range is S (e.g., $S=\pi R^2$), an average number $\tilde{K}$ of available channels may be given as Equation 3.

$$\tilde{K} = \sum_{k=0}^{M-1} (M-k)e^{-SL_{on}(k)} \frac{(SL_{on})^k}{k!} = \quad \text{[Equation 3]}$$

$$\frac{M \cdot \Gamma(M, SL_{on})}{\Gamma(M)} - \frac{SP_{on} \cdot \Gamma(M-1, SL_{on})}{\Gamma(M-1)}$$

In Equation 3, M refers to a total number of channels available to unlicensed devices, and k refers to the number of licensed devices existing in an operating range.

In Equation 3, $\Gamma(x)$ is a gamma function for x and is defined as Equation 4.

$$\Gamma(x)=\int_0^\infty t^{x-1}e^{-t}dt \quad \text{[Equation 4]}$$

Further, in Equation 3, $\Gamma(x,y)$ is an incomplete gamma function and is defined as Equation 5.

$$\Gamma(x,y)=\int_y^\infty t^{x-1}e^{-t}dt \quad \text{[Equation 5]}$$

System performance $T_S$ considering the average number $\tilde{K}$ of available channels may be given as Equation 6.

$$T_S = \left(1 - d_p \frac{\tilde{v}}{R}\right) \times \left(\frac{M \cdot \Gamma(M, SL_{on})}{\Gamma(M)} - \frac{SP_{on} \cdot \Gamma(M-1, SL_{on})}{\Gamma(M-1)}\right) \quad \text{[Equation 6]}$$

As shown in Equation 6, the system performance $T_S$ may be expressed as a product of the system performance $T_L$ depending on the frequency of requesting available channel information, and the average number $\tilde{K}$ of available channels. As noted by Equation 6, if the operating range R is set large, the system performance may be improved. If the average number $\tilde{K}$ of available channels is increased, the system performance may also be improved.

Figure 5:
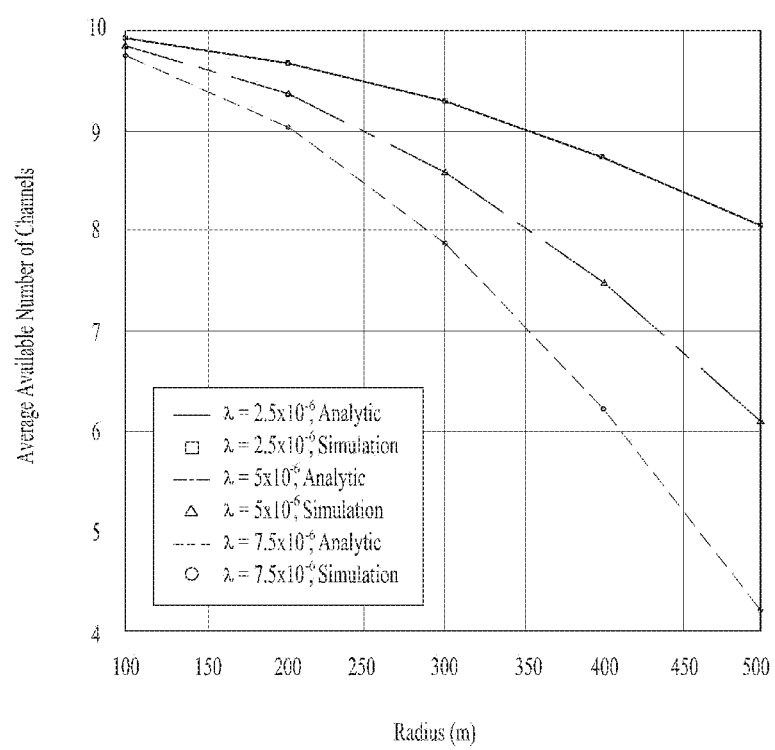
FIG. 5 is a view illustrating a simulation result of an average number of available channels per a density of licensed devices based on a set radius.

FIG. 5 is a view illustrating a simulation result of an average number of available channels per a density λ of licensed devices based on a set radius. As shown in FIG. 5, if an operating range is set large (or wide), an area for and the number of licensed devices to be considered are increased and thus an average number of available channels is reduced. That is, if the operating range is set large to reduce the frequency (or time delay) for acquiring available channel information, an average number of available channels may be reduced and thus overall system performance may also be reduced. In other words, when the operating range is set, reduction in time delay and increase in the number of available channels are in trade-off relationship. Accordingly, to determine optimal system performance, an appropriate operating range should be set in consideration of both the time delay and the number of available channels.

Available Channel Information in Consideration of Directionality

In the above described scheme for requesting and responding available channel information based on setting of an operating range, the available channel information is determined in consideration of even locations not included in an actual moving route of an STA. That is, when an available channel list is formed using commonly available channels in a wide operating range, a channel which is available on an actual moving route of an STA may not be included in the available channel list. Accordingly, setting of an operating range in consideration of directionality related to a moving route of an STA is required. According to a conventional available channel information determination scheme, information about directionality is not considered to set an operating range.

FIG. 6 is a view for describing an example of setting an operating range according to the present invention.

FIG. 6(a) shows a conventional example of setting an operating range, and FIG. 6(b) shows an example of setting an operating range according to the present invention. In FIGS. 6(a) and 6(b), the locations of licensed devices are marked as dots on the X-Y coordinate plane.

FIG. 6(a) shows an operating range set based on information indicating one location and information indicating a radius. In FIG. 6(a), the single location is indicated as (0,0) on the X-Y axes and the radius is indicated as 500 m. Further, in FIG. 6(a), eight licensed devices are present on an X-Y coordinate plane of 1 km×1 km, and seven licensed devices are present in the operating range. In this case, available channels within the operating range may be determined in consideration of channels not used by the seven licensed devices.

FIG. 6(b) shows an operating range set based on directionality of an STA. Since only one licensed device is present in the operating range as described above, available channels within the operating range may be determined in consideration of only channels not used by the licensed device. That is, compared to FIG. 6(a), channels available to the STA may be determined without considering channels used by six licensed devices, and thus the number of available channels may be greatly increased.

Specifically, available channels are determined in consideration of an area of $\pi \times 500^2 (\approx 785398) m^2$ in FIG. 6(a), and available channels are determined in consideration of an area of $600 \times 200 (=120000) m^2$ in FIG. 6(b). That is, although the STA moves by the same distance in FIGS. 6(a) and 6(b), the area to be considered is reduced by about 85% in FIG. 6(b) compared to FIG. 6(a). Since the area to be considered is greatly reduced, the number of licensed devices existing in the area may also be greatly reduced, and thus the number of channels available to unlicensed devices may be greatly increased.

If a moving route of an STA is predictable, directionality of the STA may be determined, and an operating range may be set based on the directionality. For example, a predicted moving route of the STA may be determined using navigation information (or route search information). The navigation information may be determined using a navigation function of the STA, or acquired from a separate navigation device related to the STA.

The navigation information may basically include information about a predicted moving route previously determined according to an origin point and a destination set on a map. That is, a change in directionality on the predicted moving route of the STA may be previously known based on the navigation information. In general, an STA of a user who moves in a vehicle in downtown may have a large change in directionality, an STA of a user who moves in a bus or subway which moves according to a fixed route may have a smaller change in directionality, and an STA of a user who moves on an expressway or railroad may have the smallest change in directionality.

Figure 7:
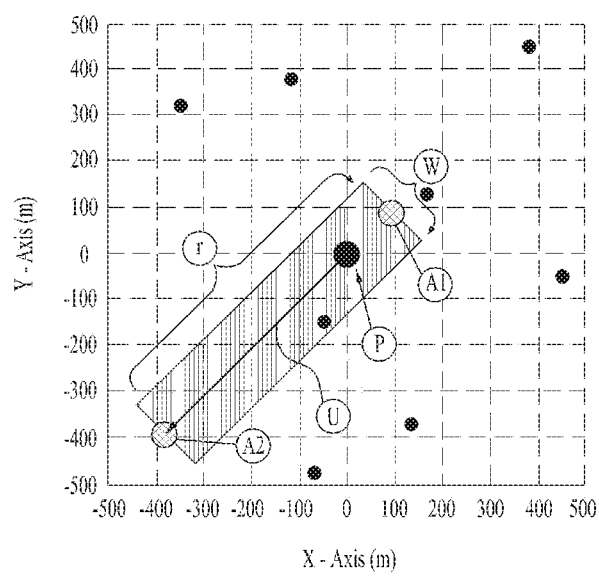
FIG. 7 is a view for describing an example of setting an operating range in consideration of directionality according to the present invention.

FIG. 7 is a view for describing an example of setting an operating range in consideration of directionality according to the present invention.

To describe the principle of setting an operating range according to the present invention, the operating range may be set using two basic types of information, e.g., two pieces of location information and a piece of width information of the operating range. That is, it is assumed that a single directionality is set and not changed. A case in which directionality is changed will be described in detail further below.

In FIG. 7, a reference location P may be set as, for example, a current location of an STA or a reference point for changing directionality. P may be specified as (Px, Py). Further, a predicted moving direction and a predicted moving distance of the STA may be given using a vector u. That is, |u| from the reference point P may correspond to the predicted moving distance. A unit direction vector u' may be expressed as u'=u/|u|. Further, u' may be expressed as an x-axis direction vector $u_x'$ and a y-axis direction vector $u_y'$. That is, u': $\{u_x', u_y'\}$.

A first location A1 may be set as a location spaced apart from the reference location P by a predetermined distance in a direction opposite to the moving direction of the STA. By setting the first location A1, which is a start point of the operating range, as a location in an opposite direction from the reference location P as described above, licensed devices peripheral to a current location of the STA may be protected and licensed devices peripheral to a directionality-changed location may also be protected if a plurality of operating ranges for a predicted moving route of the STA are set as will be described below. In addition, the distance between P and A1 may be appropriately selected based on the accuracy of predicted directionality, transmit power of the moving STA, etc. FIG. 7 shows an example of setting A1 as a location spaced apart from P by 100 m in a direction opposite to the moving direction.

A second location A2 may be set as a location spaced apart from the reference location P by a predetermined distance (e.g., |u|) in the moving direction of the STA.

When A1 and A2 are determined, a linear distance from A1 to A2 may be expressed as r, and the area of the operating range may be expressed as r×w. Here, the width w of the operating range may be set to be equal to or greater than a predetermined distance. FIG. 7 exemplarily shows that w is 200 m. The value w may be appropriately set based on the accuracy of predicted directionality, transmit power of the moving STA, etc.

As described above, one operating range may be specified using two pieces of location information (A1 and A2) and a piece of width information. If one operating range is determined for a single directionality, considering that directionality may be changed on a predicted moving route of an STA, two or more contiguous operating ranges should be set to include the whole predicted moving route of the STA. In this case, two pieces of location information may be needed to set one operating range, and one more piece of location information may be needed whenever another operating range is added. This is because, with regard to two contiguous operating ranges, an end point of a first operating range is the same as a start point of a second operating range.

As such, if the maximum number of pieces of location information to be included in one CAQ request frame is n, available channel information on a predicted moving route including up to n−1 changes in directionality (i.e., n−1 operating ranges) may be requested.

A description is now given of improvement in system performance achieved using available channel information request/response (i.e., CAQ request/response) for an operating range set in consideration of directionality. To describe overhead for available channel information request/response, the configuration of a CAQ frame is described first.

Figure 8:
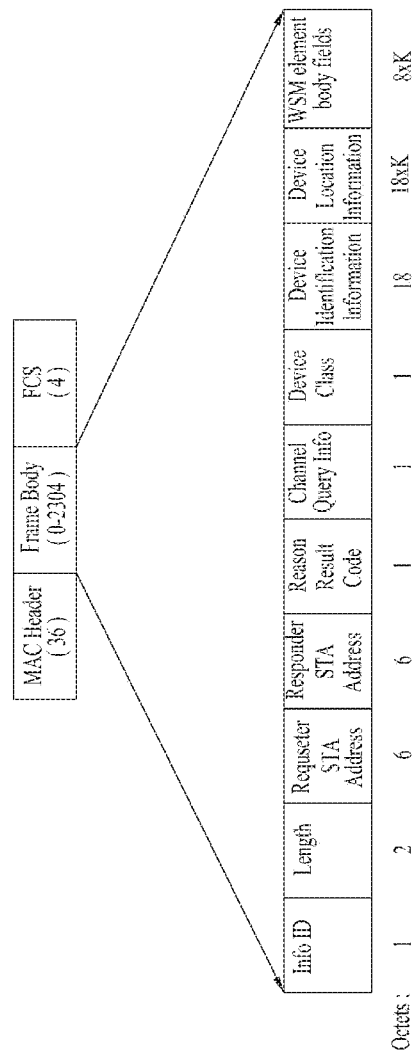
FIG. 8 is a view illustrating an example of a channel availability query (CAQ) frame format.

FIG. 8 is a view illustrating an example of a CAQ frame format.

Referring to FIG. 8, a MAC frame including a CAQ element include information of MAC Header (36 octets)+Frame Body (0 to 2304 octets)+Frame Check Sequence (FCS) (4 octets). The Frame Body includes information of Info ID (1 octet)+Length (2 octets)+Requester STA Address (6 octets)+Responder STA address (6 octets)+Channel Query Info (1 octet)+Device Class (1 octet)+Device Identification Information (18 octets)=35 octets other than location information and WSM information. That is, a total length from the Info ID to Device Identification Information fields other than a Reason Result Code field may be 35 octets. Accordingly, MAC Header (36 octets)+FCS (4 octets)+Frame Body {Info ID to Responder STA Address, Channel Query Info to Device Identification Information} (35 octets)=75 octets.

When basic overhead in the CAQ MAC frame is 75 octets as described above, if an STA requests available channel information for one location, 18 octets corresponding to the Device Location Information field is repeated once and thus a required amount of information is 75+18=93 octets. Meanwhile, when a GDB transmits available channel information for one location, 8 octets corresponding to the WSM element body field is repeated once and thus a required amount of information is 75+8=83 octets. That is, when K=1, an average of overhead (=93) for a CAQ request and overhead (=83) for a CAQ response is 88 (=(93+83)/2).

When available channel information for an operating range set in consideration of directionality according to the present invention is requested/responded, the number of changed in directionality (or the number of operating ranges) is assumed as K. In this case, available channel information for K+1 locations may be requested to a GDB, and available channel information for K operating ranges may be responded from the GDB. Here, a CAQ request for K+1 locations may have overhead of 75+18(K+1) and a CAQ response for K operating ranges may have overhead of 75+8K. In this case, average overhead $O_v$ may be expressed as Equation 7.

$$O_v = \frac{\{75+18(K+1)\}/88 + (75+8K)/88}{2} = \frac{84+13K}{88} \quad \text{[Equation 7]}$$

In Equation 7, {75+18(K+1)}/88 corresponds to overhead for a CAQ request for K+1 locations and (75+8K)/88 indicates overhead for a CAQ response for K operating ranges. As such, the average overhead $O_v$ is expressed as (84+13K)/88.

A predetermined field (e.g., Reason Result Code field or Channel Query Info field) of the CAQ frame format may include a Number of Device Location Information field. When the Number of Device Location Information field has a size of 3 bits, a request of available channel information for up to eight locations is allowed. This may correspond to a request of available channel information for a predicted moving route including up to seven changes in directionality (i.e., up to seven operating ranges), and available channel information (WSM) for seven operating ranges may be provided through a CAQ response frame.

It may be assumed that a CAQ request/response procedure has the maximum overhead, i.e., available channel information for eight locations is requested using one CAQ request, and available channel information for operating ranges corresponding to seven changes in directionality is received through a CAQ response thereto. This corresponds to a case in which K=7 in Equation 7. In this case, $O_v$ is approximately 2.

A description is now given of system performance when an operating range is set in consideration of directionality as proposed by the present invention. In the loss of the system performance (i.e., $d_p(\tilde{v}/R)$) of Equation 2, the overhead $O_v$ of Equation 7 should be calculated as an additional loss of the system performance. In this case, system performance calculated in consideration of the overhead $O_v$ of a CAQ request/response procedure may be expressed as Equation 8.

$$T_{L,direction} = \left(1 - d_p O_v \frac{v}{R}\right) \quad \text{[Equation 8]}$$

Here, an average moving speed of an STA is assumed as $\tilde{v}$=40 m/s, a radius of an operating range is assumed as R=500 m, and a time taken to update available channels is assumed as $d_p$=0.5 s. In this case, the system performance according to Equation 2 is calculated to approximately 0.96, and a loss of the system performance is calculated to approximately 0.04 (i.e., 4%). Meanwhile, under the same condition, if it is assumed that a CAQ request/response procedure has the maximum overhead, $O_v \approx 2$ when K=7. In this case, the system performance according to Equation 8 is calculated to approximately 0.92, and a loss of the system performance is calculated to approximately 0.08 (i.e., 8%). That is, when directionality information is considered, an additional loss of the system performance may be approximately 4%.

Meanwhile, available channels are determined in consideration of an area of $\pi \times 500^2 (\approx 785398) m^2$ as shown in FIG. 6(a) when directionality information is not considered, and available channels are determined in consideration of an area of 600×200(=120000)m² as shown in FIG. 6(*a*) when directionality information is considered. That is, the area of an operating range when directionality information is considered corresponds to approximately 15% of the area of an operating range when directionality information is not considered (i.e., the area of an operating range is reduced by approximately 85%). To infer the number of available channels in this case, if a radius of a circular area of FIG. 6(*a*) is given as $R_0$, an effective radius $R_{eff}$ of a circular area corresponding to the operating range of FIG. 6(*b*) may be determined using Equation 9.

$$\pi \times R_{eff}^2 \approx 0.15 \times \pi \times R_0^2 \quad \text{[Equation 9]}$$

In Equation 9, the effective radius $R_{eff}$ is calculated to $R_{eff} \approx 0.3909\ R_0$. That is, $R_{eff}$ may be reduced by approximately 61% compared to $R_0$. That is, if $R_0$ is 500 m, $R_{eff}$ corresponds to approximately 195.5 m. In this case, if the density λ of licensed devices is assumed as $2.5 \times 10^{-6}$ in FIG. 5, the number of available channels for a radius of 500 m is 8, and the number of available channels for a radius of 195.5 m corresponds to 9.7. That is, when an operating range is determined in consideration of directionality information, the number of available channels may be increased by approximately 22%.

Collectively considering the above results, when available channel information for an operating range set in consideration of directionality according to the present invention is used, an additional loss of system performance occurring due to increase in overhead of a CAQ request/response procedure is approximately 4% but the system performance is improved by approximately 22% due to increase in the number of available channels.

Figure 9:
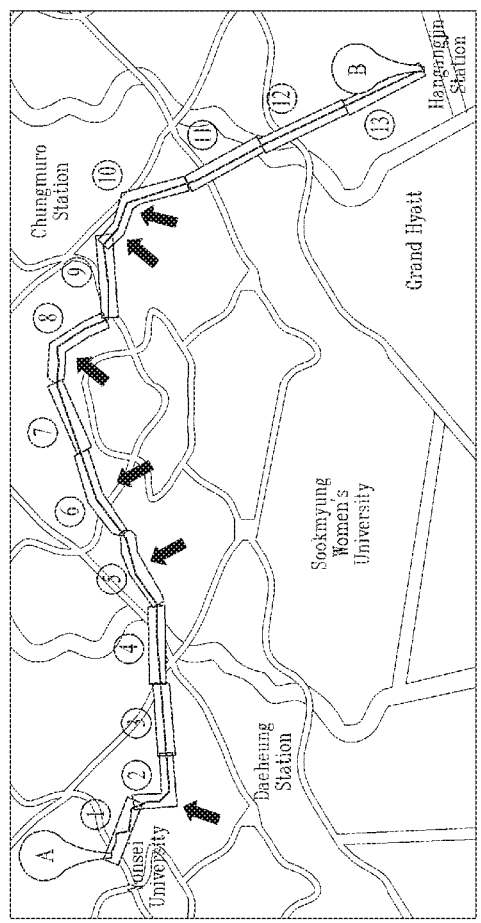
FIG. 9 is a view illustrating an example of setting a plurality of operating ranges.

FIG. 9 is a view illustrating an example of setting a plurality of operating ranges.

FIG. 9 shows that a predicted moving route of an STA from Yonsei University at Sinchon to Hangangjin Station is determined using navigation route search. Further, FIG. 9 shows that a length r of one operating range set in consideration of directionality is fixed to 600 m. If it is assumed that a CAQ request/response procedure is performed once to acquire available channel information for one operating range, since the whole moving distance of 7.8 km is divided into thirteen 600 m operating ranges, the CAQ request/response procedure may be performed thirteen times.

In FIG. 9, there are cases in which the direction at a start point is changed into another direction within one operating range. In these cases, available channel information for multiple directionalities (or, multiple sub operating ranges) should be acquired by performing a CAQ request/response procedure once. In FIG. 9, a total of six changes in directionality occur (see arrows in FIG. 9). Operating ranges including changes in directionality are ②, ⑤, ⑥, ⑧ and ⑩. In particular, two changes in directionality occur in operating range ⑩. Available channel information for a single directionality may be requested/responded in operating ranges including no change in directionality, and available channel information for n+1 directionalities (or, n+1 sub operating ranges) may be requested/responded in operating ranges including n changes in directionality. In FIG. 9, one operating range may include 1.4615 (=(1+2+1+1+2+2+1+2+1+3+1+1+1)/13) directionalities (or, sub operating ranges) in average. Accordingly, if overhead for transceiving information about one operating range by performing a CAQ request/response procedure once is 1, when operating ranges are set in consideration of directionality according to the present invention, the overhead may be increased by 0.4615.

If a change in directionality occurs within a moving route, according to a conventional method, since information about only one operating range (i.e., one operating range determined using center location and radius information as shown in FIG. 6(*a*)) including the moving route is transceived by performing a CAQ request/response procedure once, overhead is not changed even when directionality is changed. However, according to the present invention, since a plurality of operating ranges are set according to changes in directionality and information about a plurality of operating ranges (i.e., a plurality of the operating range determined using two pieces of location information and a piece of width information as shown in FIG. 6(*b*)) is transceived by performing a CAQ request/response procedure once, overhead is increased due to changes in directionality and thus reduction in performance may occur. However, according to the present invention, if operating ranges are set in consideration of directionality, an area to be considered to determine available channels may be greatly reduced and thus the number of available channels may be increased. Accordingly, even when information about, in the worst case, seven operating ranges is transceived by performing a CAQ request/response procedure once, improvement of system performance due to increase in the number of available channels is greater than a loss of the system performance due to overhead, and thus the system performance may be improved by setting operating ranges in consideration of directionality.

Figure 10:
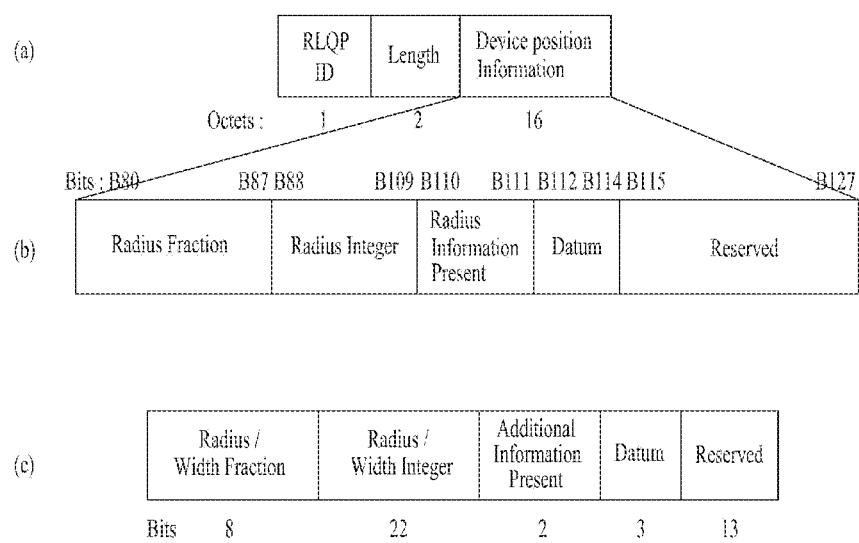
FIG. 10 is a view for describing the detailed configuration of a Device Location Information field according to the present invention.

FIG. 10 is a view for describing the detailed configuration of a Device Location Information field according to the present invention.

FIG. 10(*a*) shows the detailed configuration of the Device Location Information field in the CAQ frame format of FIG. 8. As shown in FIG. 10(*a*), the Device Location Information field may include a Device Position Information field as a sub field.

FIG. 10(*b*) exemplarily shows field configuration for indicating a device location when an operating range is set using a conventional method (e.g., FIG. 6(*a*)). For example, Radius Fraction, Radius Integer, Radius Information Present, Datum fields may be included and other bits may be reserved.

FIG. 10(*c*) exemplarily shows the configuration of the Device Position Information field proposed by the present invention. In FIG. 10(*c*), the Radius Fraction field of FIG. 10(*b*) is changed into a Radius/Width Fraction field, and the Radius Integer field of FIG. 10(*b*) is changed into a Radius/Width Integer field.

When channel information for K operating range set in consideration of K directionalities is requested, an STA should notify K pieces of width information and K+1 pieces of contiguous location information to a GDB using a CAQ request frame. The number of pieces of location information (up to 8) may be set using a Number of Device Location Information field having a size of 3 bits and included in a predetermined field (e.g., Reason Result Code field or Channel Query Info field) of the CAQ frame format.

If the value of an Additional Information Present field in the Device Position Information field of FIG. 10(*c*) is 0, this indicates that available channel information based on own location of an STA is requested. If the value is 1, this indicates that available channel information for an operating range set based on radius information is requested. Otherwise, if the value is 2, this indicates that available channel information for an operating range set based on directional width information is requested.

When the STA desires to request available channel information for operating ranges set based on K different directionalities, the Device Location Information field may be repeated K+1 times to include information about K+1 locations. Further, width information of each operating range may be included in the Device Location Information field for a start point of the operating range, and the last piece of the location information may include no width information.

The GDB which receives the CAQ request frame configured as described above may detect that the CAQ request STA requests available channel information corresponding to K operating ranges based on K+1 pieces of contiguous location information and K pieces of width information, using the Number of Device Location Information field and an Additional Information field in the CAQ request frame. The GDB may specify K operating ranges based on the location information and the width information, calculate an available channel list corresponding to each operating range, and transmit available channel information to the STA using a WSM element body of a CAQ response frame. K WSM element body fields for K operating ranges may be included in the CAQ response frame.

The CAQ frame format of FIGS. 8 and 10 is merely an example and is not limited thereto. That is, the scope of the present invention includes various modifications in which the CAQ request frame includes information indicating the number of device locations, information indicating K+1 locations, and information indicating K widths, and various modifications in which the CAQ response frame includes available channel information for K operating ranges.

Figure 11:
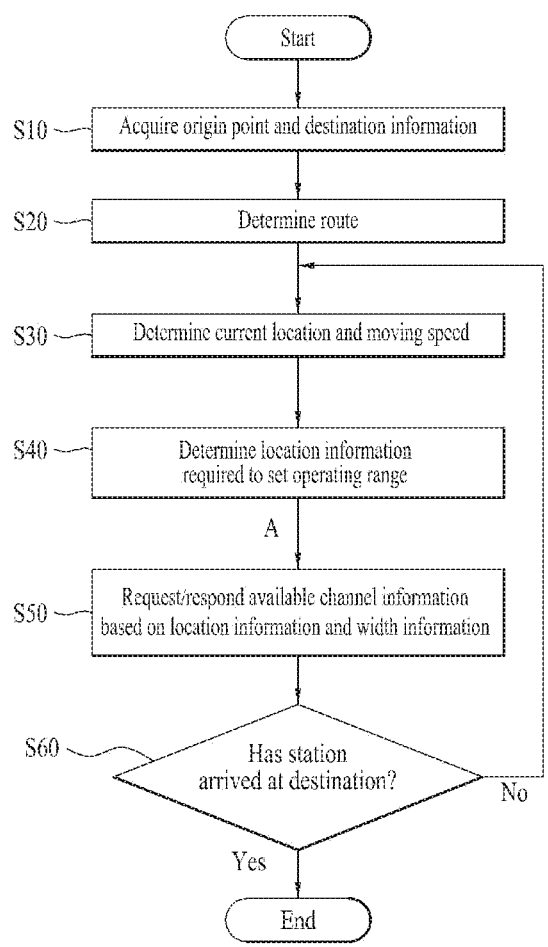
FIGS. 11 and 12 are flowcharts for describing an available channel information request/response method according to an embodiment of the present invention.
Figure 12:
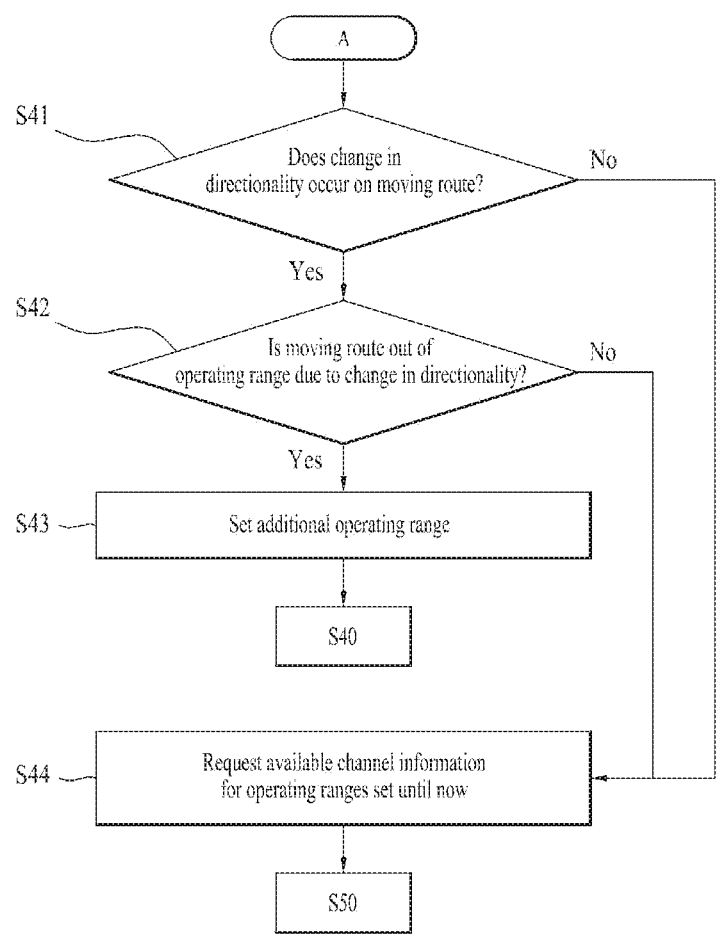

FIGS. 11 and 12 are flowcharts for describing an available channel information request/response method according to an embodiment of the present invention.

In step S10, an STA may acquire information about an origin point and a destination. This information may be acquired due to a user input or extracted from other location information.

In step S20, the STA may determine a moving route. For example, the moving route of the STA may be set based on the information about the origin point and the destination acquired in step S10 as the shortest route, excluding toll roads, in consideration of current traffic flow using a conventional navigation technology. The moving route set in step S20 corresponds to a predicted moving route of the STA and, if the actual location of the STA is out of the predicted moving route, the predicted moving route from the corresponding location to the destination may be reset. For clarity, it is assumed that the predicted moving route is not changed.

In step S30, the STA may determine a current location and a moving speed. This step may be performed using a conventional GPS technology, etc.

In step S40, the STA may determine location information required to set an operating range. The location information required to set the operating range may be determined using the method described above in relation to FIG. 7. For example, a current location P of the STA may be determined in step S30, or a point A2 from which a moving direction of the STA is changed on the moving route determined in step S20 may be determined. As such, A1 and A2 for specifying the operating range may be determined. Further, a width w of the operating range may be determined in consideration of a moving speed of the STA, the size of transmit power, etc. As such, one operating range (i.e., one operating range with no change in directionality) may be determined by r, which is a linear distance from A1 to A2, and the width w.

After step S40, step A may be performed. A detailed description of step A is now given with reference to FIG. 12.

In step S41, the STA may determine whether a change in directionality occurs on the moving route. If a change in directionality does not occur, since no additional operating range needs to be set, the method may proceed to step S44 and available channel information for operating ranges set until now may be requested. If a change in directionality occurs, the method proceeds to step S42.

In step S42, the STA may determine whether the moving route of the STA is out of the currently set operating range due to the change in directionality. Even when the change in directionality occurs, if the moving route of the STA is included in the currently set operating range, since no additional operating range needs to be set, the method may proceed to step S44 and available channel information for operating ranges set until now may be requested. Upon determining that the moving route of the STA is out of the currently set operating range due to the change in directionality, the method proceeds to step S43.

In step S43, the STA may determine to request available channel information for a plurality of operating ranges including an additional operating range. In this case, in step S40 of FIG. 11, location information for the additional operating range may be determined For example, when a change in directionality occurs on the moving route and the moving route is out of the currently set operating range, A2 of a previous operating range may be set as P of a subsequent operating range. As such, A1 and A2 for the additional operating range may be determined, and new w may be determined After the additional operating range is set, step A may be performed again and thus another additional operating range may be set.

As a result of step A, whether to request available channel information for operating ranges set until now, or operating ranges including an additional operating range may be determined Referring back to FIG. 11, in step S50, the STA may request available channel information based on information about one or more operating ranges according to the result of step A, and acquire available channel information for one or more operating ranges as a response thereto. When the available channel information is requested, information about K operating ranges may include K+1 pieces of location information and K pieces of width information. Further, available channel information for the K operating ranges may include K pieces of WSM element information.

In step S60, the STA may determine whether the STA has arrived at the destination. If the STA has not arrived at the destination, the method returns to step S30 and an operating range may be set in consideration of directionality and available channel information may be requested/responded. If the STA has arrived at the destination, setting of operating ranges in consideration of directionality according to the present invention may be terminated.

Figure 13:
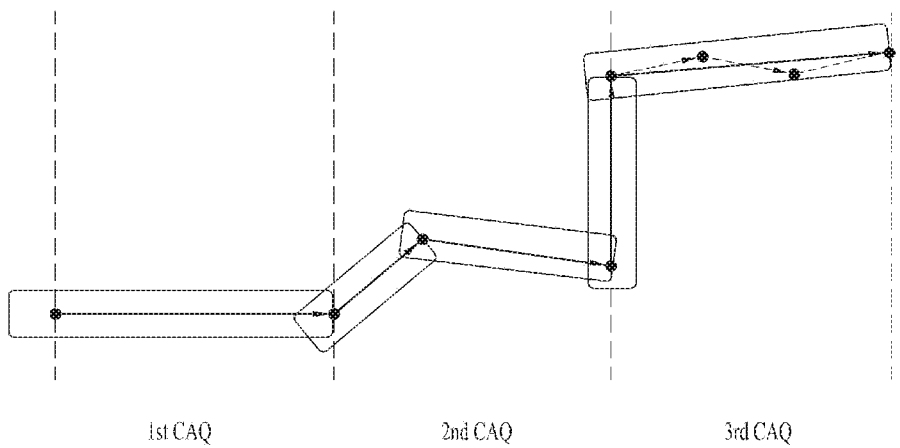
FIG. 13 is a view illustrating an example of setting an operating range in consideration of directionality on a moving route of a station (STA) according to the present invention.

FIG. 13 is a view illustrating an example of setting operating ranges in consideration of directionality on a moving route of an STA according to the present invention.

A $1^{st}$ CAQ request/response operation of FIG. 13 shows a case in which a change in directionality does not occur for a certain moving distance and one operating range is set using only two pieces of location information and a piece of width information.

A $2^{nd}$ CAQ request/response operation of FIG. 13 shows a case in which two changes in directionality occur for a certain moving distance. In this case, three operating ranges may be set using four pieces of location information and three pieces of width information.

A 3$^{rd}$ CAQ request/response operation of FIG. 13 shows a case in which two changes in directionality actually occur but are included in coherent directions. That is, this case corresponds to a case in which a change(s) in directionality occurs but a moving route is not out of a currently set operating range as in step S42 of FIG. 12. In this case, instead of determining four pieces of location information and three pieces of width information, one operating range set based on two pieces of location information and a piece of width information is enough.

Figure 14:
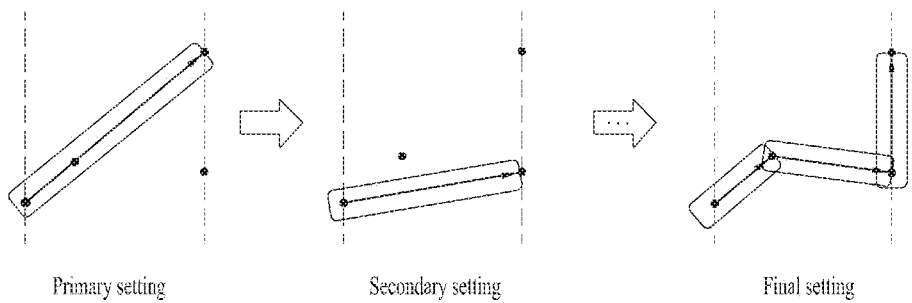
FIG. 14 is a view illustrating an example of setting operating ranges in consideration of changes in directionality according to the present invention.

FIG. 14 is a view illustrating an example of setting operating ranges in consideration of changes in directionality according to the present invention.

FIG. 14 shows a specific scheme for setting operating ranges in the 2$^{nd}$ CAQ request/response operation of FIG. 13. As illustrated in FIG. 14, four locations at which changes in directionality occur on a moving route of an STA may be determined Initially, an operating range for linearly connecting the first location and the last location is set (primary setting). However, since the primarily set operating range does not include the third location, the primarily set operating range may be determined as being inappropriate.

Then, an operating range for linearly connecting the first location and the third location not included in the primarily set operating range (secondary setting). However, since the secondarily set operating range does not include the second location, the secondarily set operating range may also be determined as being inappropriate.

Then, if an operating range for linearly connecting the first location and the second location not included in the secondarily set operating range, since no change in directionality occurs therebetween, the corresponding operating range is determined as being appropriate. After that, it is determined whether an operating range for linearly connecting the second location and the fourth location is appropriate. If the operating range is inappropriate, an operating range from the second location to the third location may be set. As such, finally, three operating ranges may be set as in the 2$^{nd}$ CAQ request/response operation of FIG. 13.

The above principle may also be applied to operating ranges set in the 3$^{rd}$ CAQ request/response operation of FIG. 13. In this case, since an operating range for linearly connecting the first location and the fourth location among four locations in consideration of changes in directionality includes both the second and third locations, primary setting may be final setting.

Figure 15:
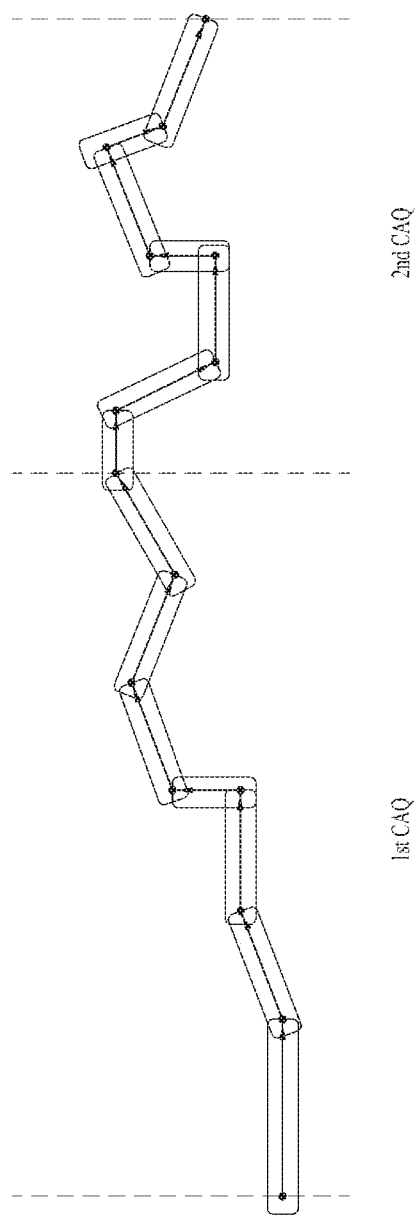
FIG. 15 is a view illustrating another example of setting operating ranges in consideration of changes in directionality according to the present invention.

FIG. 15 is a view illustrating another example of setting operating ranges in consideration of changes in directionality according to the present invention.

In FIG. 9, operating ranges are set on a fixed distance (e.g., 600 m) basis and, if no change in directionality occurs within one operating range, a piece of available channel information is determined for one operating range (i.e., two pieces of location information and a piece of width information) by performing a CAQ request/response procedure once.

However, since available channel information for up to seven operating ranges set based on eight pieces of location information and seven pieces of width information may be provided by performing a CAQ request/response procedure once, a method for minimizing the number of times that the CAQ request/response procedure is performed may be considered.

FIG. 15 shows an example in which operating ranges are set on a variable distance basis. That is, a scheme for previously setting seven operating ranges on a predicted moving route and acquire available channel information for the seven operating ranges by performing a CAQ request/response procedure once. In this case, a moving distance for each CAQ request/response procedure may vary. When operating ranges are set without distance restrictions as described above, the number of times that a CAQ request/response procedure is performed may be greatly reduced by appropriately controlling widths of the operating ranges.

According to the above-described method for requesting/responding available channel information for operating ranges set in consideration of directionality, since available channel information is determined by excluding areas to which an STA does not actually move, a larger number of available channels may be acquired. As such, available channels which are restricted resources in white space may be efficiently utilized and system performance may be improved.

Figure 16:
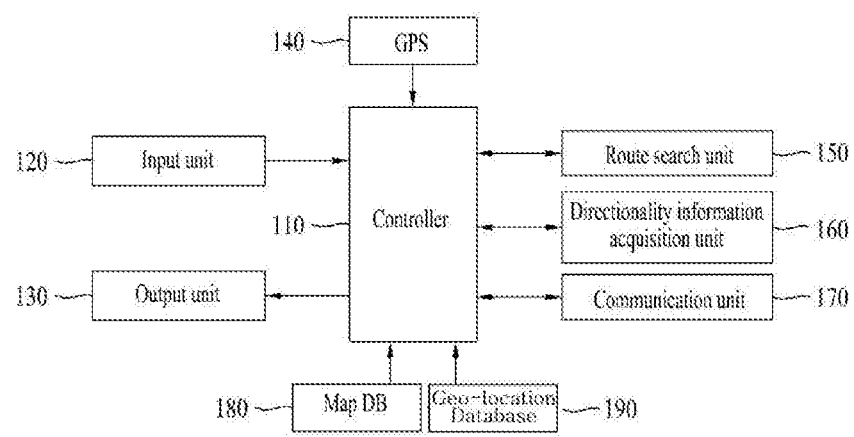
FIG. 16 is a block diagram of an STA device according to an embodiment of the present invention.

FIG. 16 is a block diagram of an STA device according to an embodiment of the present invention.

As illustrated in FIG. 16, the STA device may include a controller 110, an input unit 120, an output unit 130, a global positioning system (GPS) 140, a route search unit 150, a directionality information acquisition unit 160, a communication unit 170, a map DB 180 and Geo-Location DATABASE (GDB) 190. Here, the GPS 140, the route search unit 150, the directionality information acquisition unit 160, the map DB 180 and GDB 190 are not limited to components embedded in the STA device and may be prepared as external devices.

The communication unit 170 may transmit/receive radio signals to/from an external device and implement, for example, a physical layer according to the IEEE 802 system. The controller 110 may be connected to the communication unit 170 and implement a physical layer and/or a MAC layer according to the IEEE 802 system. The controller 110 may be configured to configure/interpret a CAQ frame format, etc. according to the above various embodiments of the present invention, and perform wireless communication using an available channel list in white space bands via the communication unit 170. Further, a module for implementing STA operations according to the above various embodiments of the present invention may be stored in memory (not shown) and executed by the controller 110. The memory may be included in the controller 110 or may be prepared outside the controller 110 and connected to the controller 110 by known means.

The above-described embodiments of the present invention may be implemented by various means, for example, hardware, firmware, software, or a combination thereof In a hardware configuration, the methods according to embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to embodiments of the present invention may be implemented in the form of a module, a procedure, a function, etc. performing the above-described functions or operations. A software code may be stored in a memory unit and executed by a processor. The memory unit may be located inside or outside the processor and exchange data with the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The above-described embodiments of the present invention are focused on the IEEE 802.11 system, but equally applicable to various mobile communication systems in which an unlicensed device operates in a white space band.

The invention claimed is:

1. A method for receiving available channel information in a white space band by a station (STA) operated in white space, the method comprising:
   determining a current location of the STA and locations from which directionality is changed, on a moving route of the STA;
   determining K operating ranges based on the current location of the STA and the locations from which the directionality is changed,
   wherein K is an integer and K≥1;
   transmitting a channel availability query (CAQ) request frame for the K operating ranges to a geo-location database; and
   receiving available channel information for the K operating ranges from the geo-location database through a CAQ response frame.

2. The method according to claim 1, wherein the CAQ request frame comprises information about the K operating ranges comprised within a fixed moving distance.

3. The method according to claim 1, wherein the CAQ request frame comprises information about the K operating ranges.

4. The method according to claim 3, wherein K is 7.

5. The method according to claim 1, wherein information about the K operating ranges comprises K+1 pieces of contiguous location information and K pieces of width information,
   wherein the width information is determined based on an accuracy of predicted directionality and transmit power of the STA that is moving along the moving route.

6. The method according to claim 5, wherein the K+1 pieces of location information comprise information about the current location of the STA, the locations from which the directionality is changed, and a destination location of the moving route.

7. The method according to claim 1, wherein one operating range of the K operating ranges is determined based on information about two locations and information about a width
   wherein the width is set to be equal to or greater than a predetermined distance.

8. The method according to claim 7, wherein the one operating range has an area determined as a product of a distance between the two locations, and the width.

9. The method according to claim 7, wherein a first location of the two locations is determined as a location spaced apart from a reference location by a predetermined distance in a direction opposite to a moving direction of the STA.

10. The method according to claim 9, wherein a second location of the two locations is determined as a location which is present in a direction equal to the moving direction of the STA from the reference location and from which the directionality is changed, or a destination location of the moving route.

11. The method according to claim 9, wherein the reference location of a first operating range of the K operating ranges is the current location of the STA.

12. The method according to claim 10, wherein the reference location of an $(n+1)^{th}$ operating range is the second location of an $n^{th}$ (n≥1) operating range,
    wherein the n is set to be equal to or below the k.

13. The method according to claim 1, wherein the moving route is a predicted moving route set based on an origin point and a destination of the STA.

14. A station (STA) device for receiving available channel information in a white space band, the STA device operated in white space comprising:
    a communication unit for communicating with an external device; and
    a controller for controlling the STA device comprising the communication unit,
    wherein the controller is configured to:
    determine a current location of the STA and locations from which directionality is changed, on a moving route of the STA;
    determine K operating ranges based on the current location of the STA and the locations from which the directionality is changed,
    wherein K is an integer and K≥1;
    transmitting a channel availability query (CAQ) request frame for the K operating ranges to a geo-location database using the communication unit; and
    receiving available channel information for the K operating ranges from the geo-location database through a CAQ response frame using the communication unit.

* * * * *